United States Patent
Otsuki et al.

(10) Patent No.: US 7,880,982 B2
(45) Date of Patent: Feb. 1, 2011

(54) LENS DRIVING APPARATUS

(75) Inventors: Noboru Otsuki, Nagano (JP); Akihito Wada, Nagano (JP); Tsuneo Sato, Nagano (JP)

(73) Assignee: Nidec Sankyo Corporation (JP)

( * ) Notice: Subject to any disclaimer, the term of this patent is extended or adjusted under 35 U.S.C. 154(b) by 331 days.

(21) Appl. No.: 11/867,409

(22) Filed: Oct. 4, 2007

(65) Prior Publication Data
US 2008/0247063 A1 Oct. 9, 2008

(30) Foreign Application Priority Data

Oct. 4, 2006 (JP) .............................. 2006-272551
Feb. 28, 2007 (JP) .............................. 2007-050357

(51) Int. Cl.
G02B 7/02 (2006.01)
(52) U.S. Cl. ...................................... 359/819; 359/822
(58) Field of Classification Search .................. 359/819
See application file for complete search history.

(56) References Cited

U.S. PATENT DOCUMENTS 7,112,083 B2 * 9/2006 Nishio et al. ................. 439/331
7,285,879 B2 * 10/2007 Osaka ...................... 310/12.02
2006/0181748 A1 * 8/2006 Makii et al. .................. 358/500

FOREIGN PATENT DOCUMENTS

| JP | 8-29656 A | 2/1996 |
| JP | 2005-037865 | 2/2005 |
| JP | 3120599 U | 3/2006 |
| JP | 2006-195452 A | 7/2006 |
| JP | 2006-201525 | 8/2006 |
| JP | 2006-227103 | 8/2006 |

* cited by examiner

Primary Examiner—Jessica T Stultz
(74) Attorney, Agent, or Firm—Cantor Colburn LLP

(57) ABSTRACT

A lens driving apparatus may include a movable body holding lenses; a support body for supporting said movable body to move in the optical axis direction of said lenses; and a drive mechanism for driving said movable body in the optical axis direction; wherein said movable body is provided with an extension portion that is extended toward the outer periphery, and a moving path and a movement-stopping portion are formed to at least a member of said drive mechanism mounted on the support body or to said support body, said moving path allowing said extension portion to move in the optical axis direction when said movable body is moved in the optical axis direction and said movement-stopping portion regulating the moving range of said movable body as said extension portion makes contact with said movement-stopping portion.

8 Claims, 8 Drawing Sheets

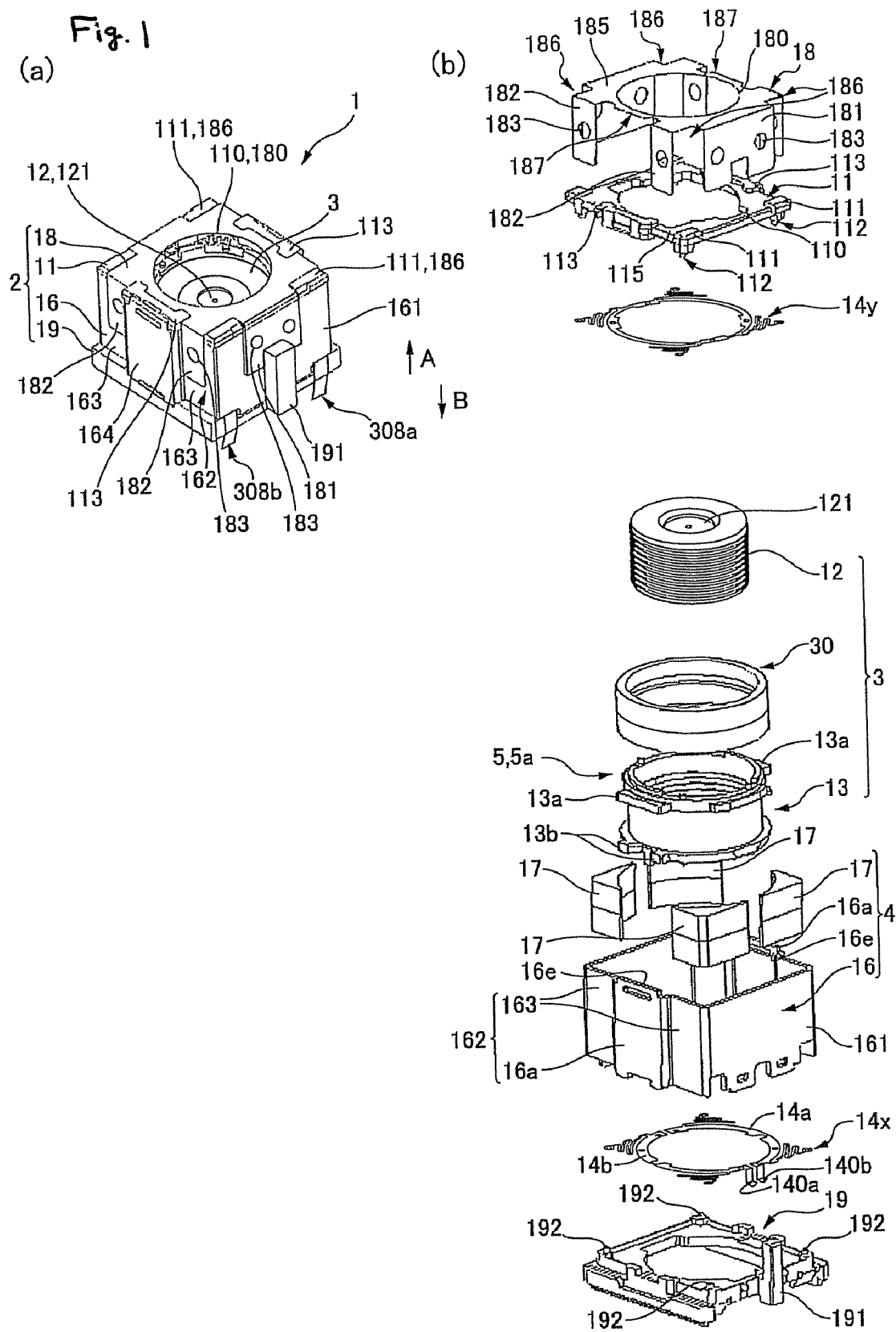

(a) Fig. 2
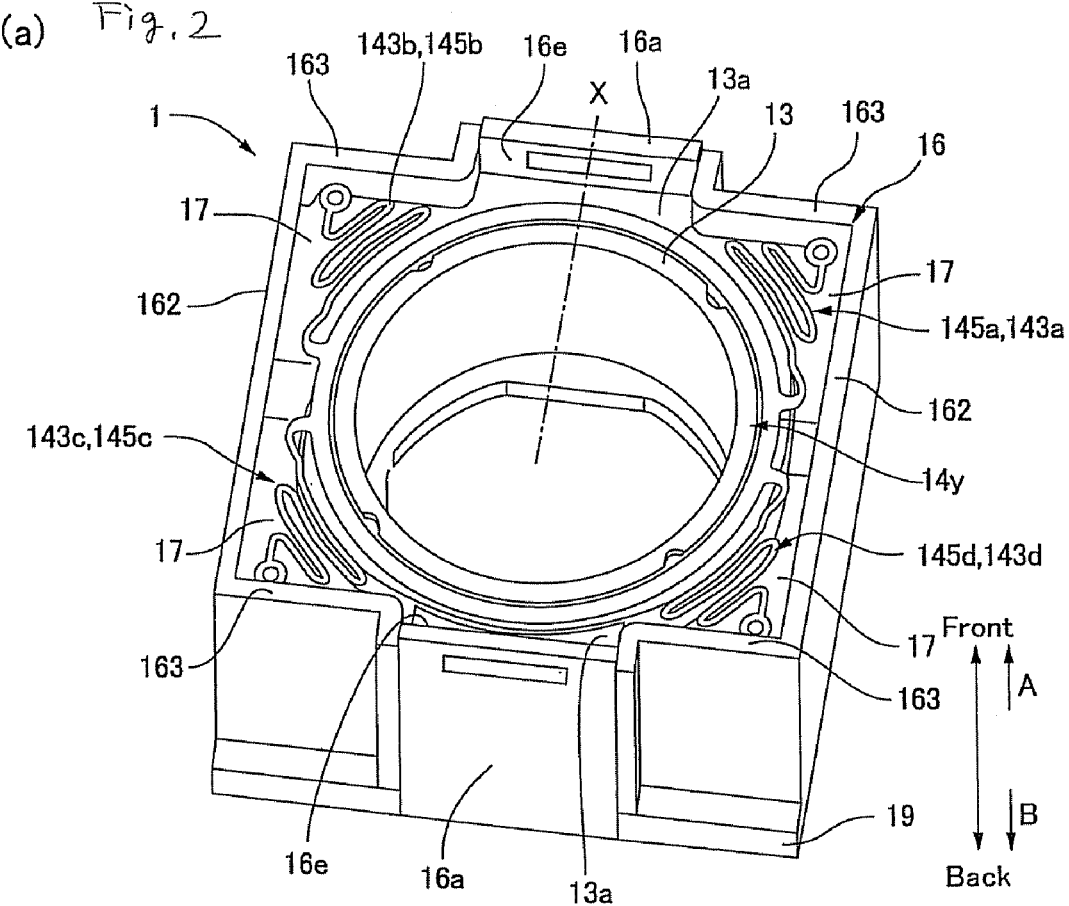
(b)
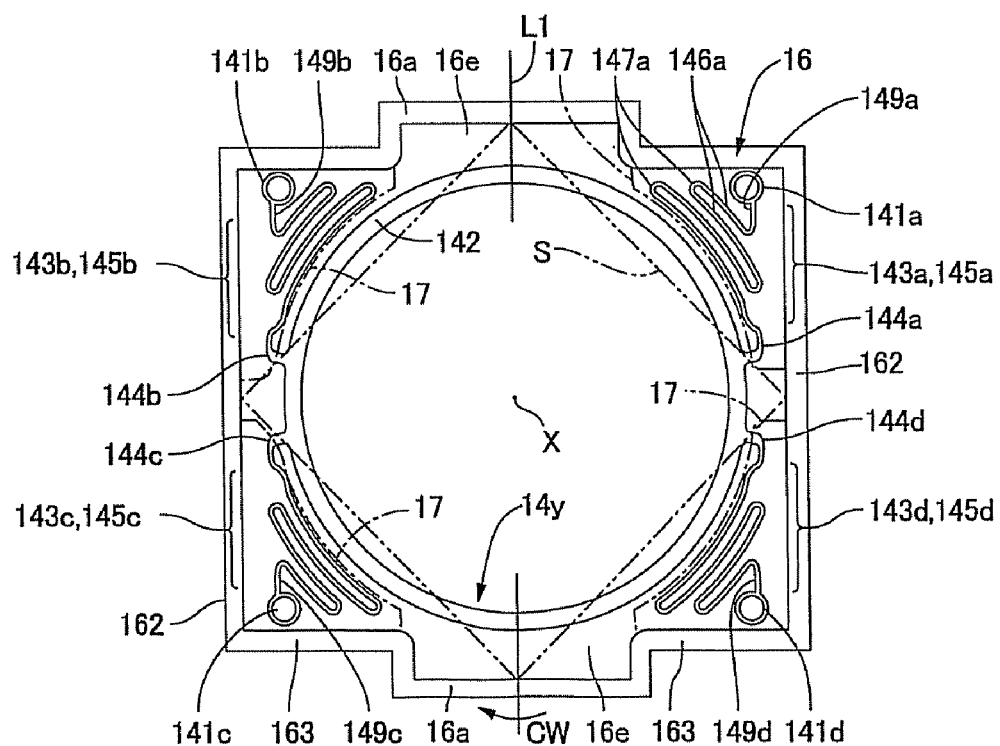

FIG. 3
(a)
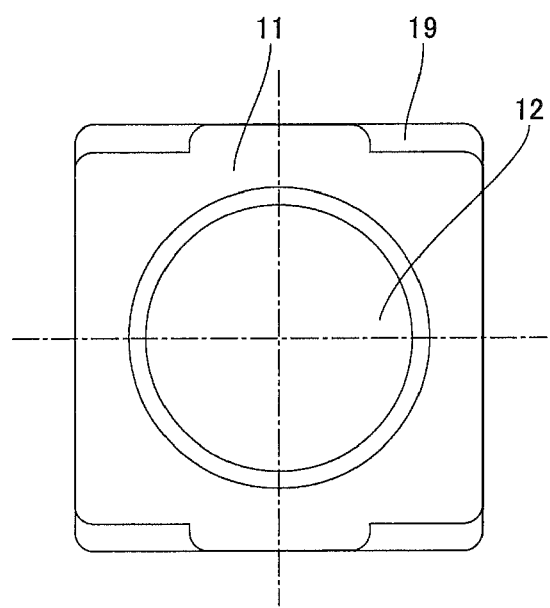
(b)
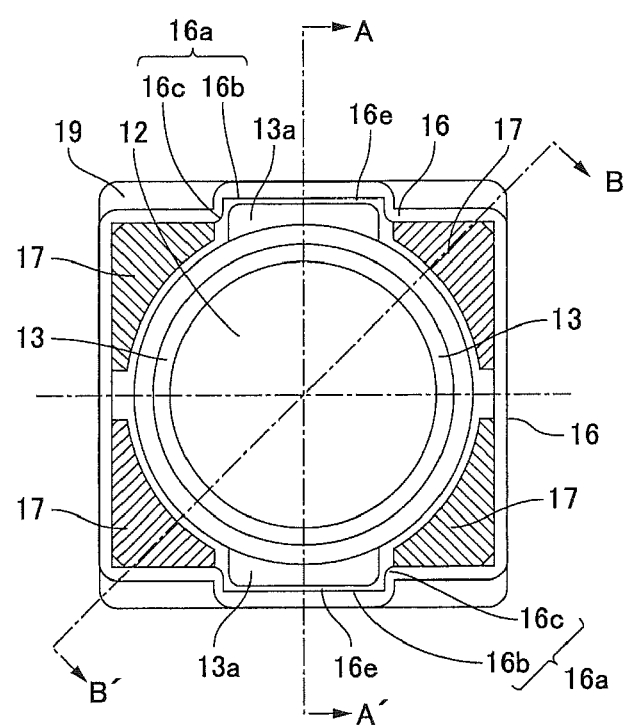

Fig. 4
(a)
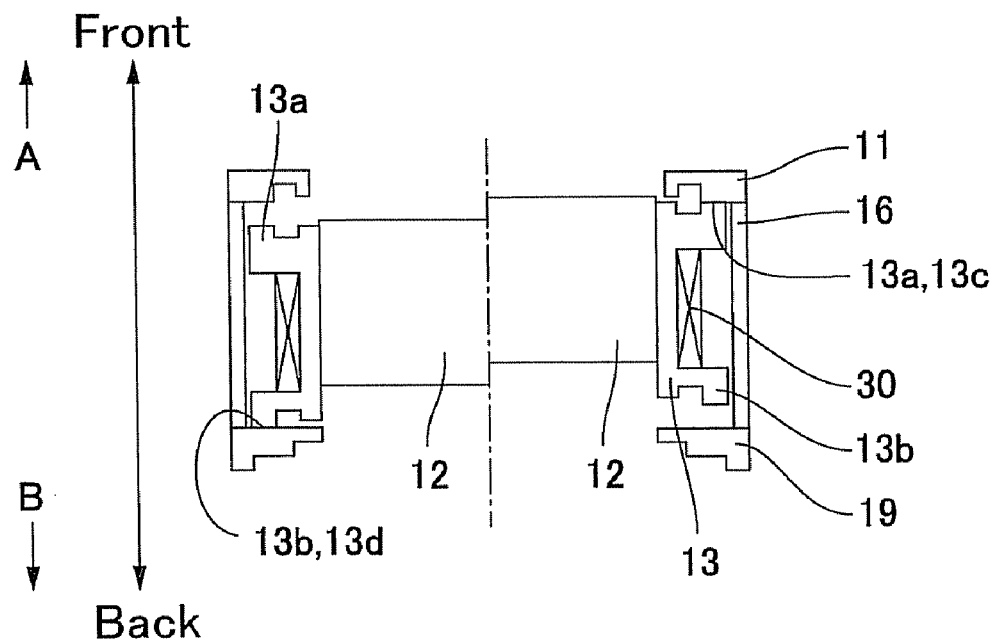
(b)
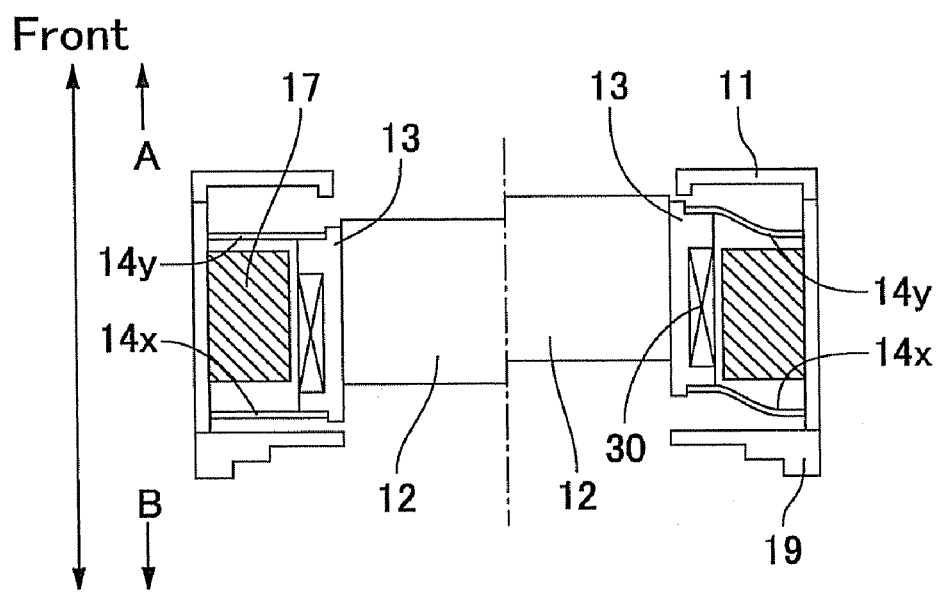

Fig5
(a)
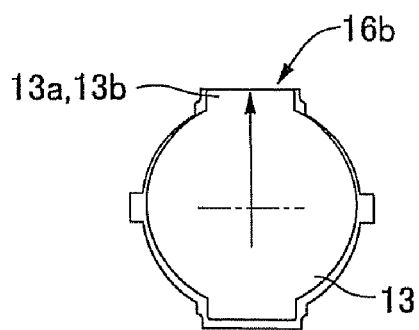
(b)
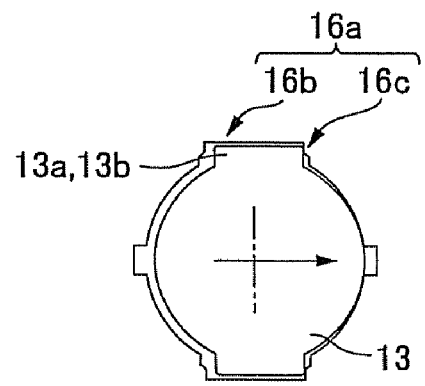
(c)
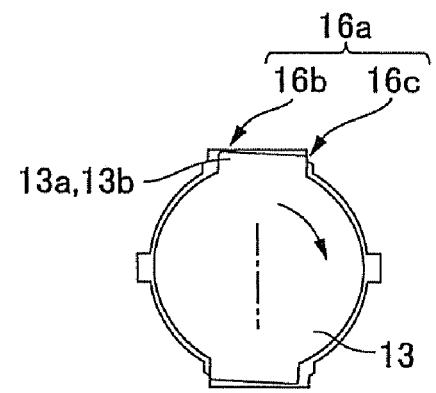
(d)
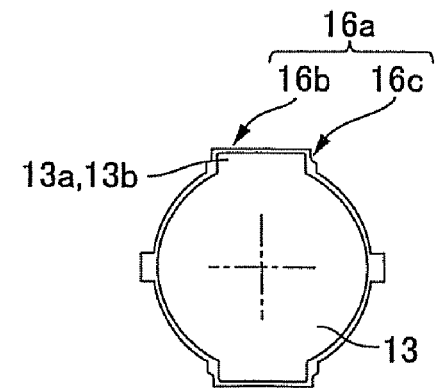

Fig. 6 (a)
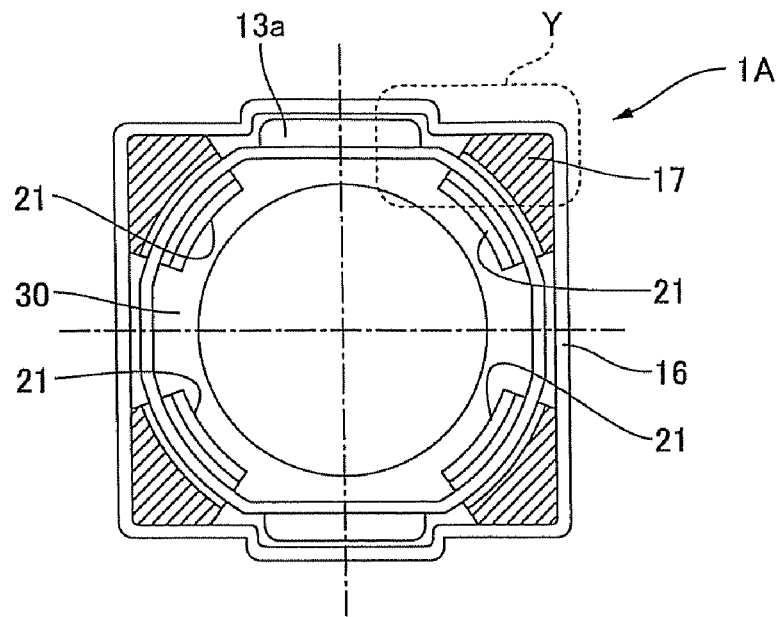
(b)
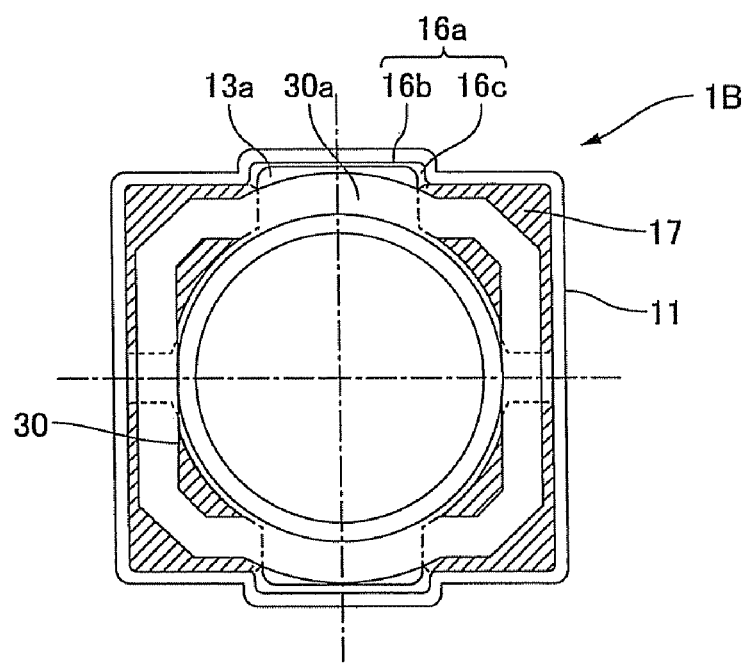
(c)
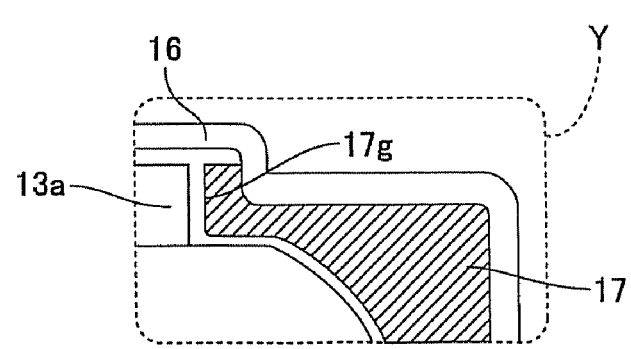

Fig. 8
(a)
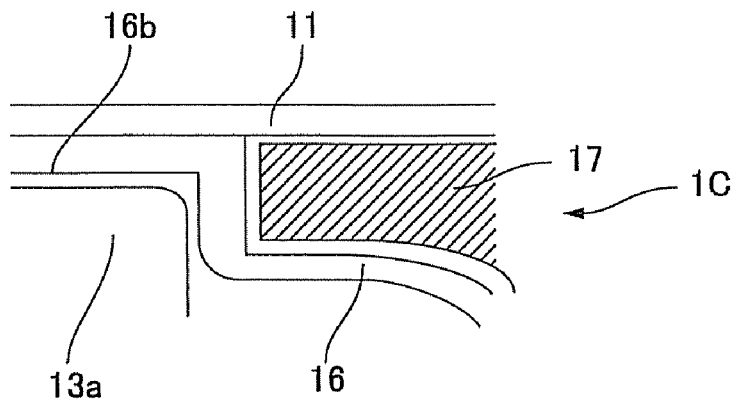
(b)
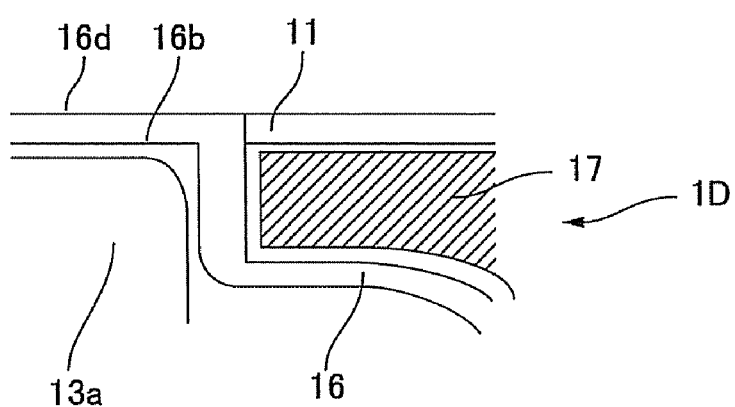
(c)
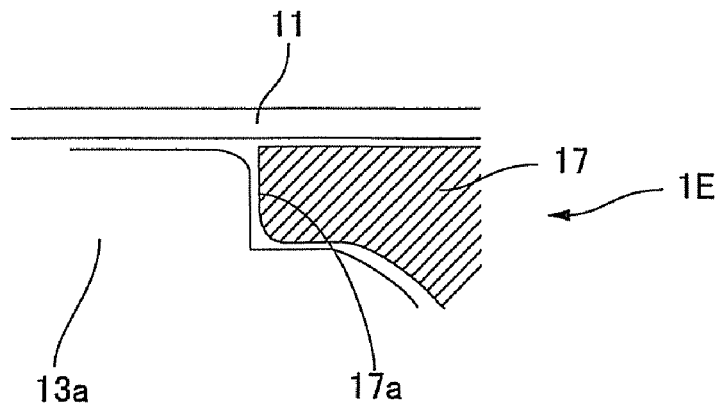

LENS DRIVING APPARATUS

This application claims priority under 35 U.S.C. 119, to Japanese applications, JP 2006-272551 filed on Oct. 4, 2006 and JP 2007-050357 filed on Feb. 28, 2007.

TECHNICAL FIELD

The disclosure relates to a lens driving apparatus that drives a lens to be displaced in the optical axis direction in order to focus an image of a subject to be photographed.

BACKGROUND

The widespread availability of camera phones having a camera function in recent years has increased the opportunities for users to photograph various kinds of photographic subjects. For example, a photographic subject at a distance from the camera lens, such as a friend or scenery, is photographed (normal snapshot) or a photographic subject at a close distance from the camera lens, such as a bus time schedule or flower petals, is photographed (close-up photography).

For close-up photography (macro photography), the camera lens needs to be positioned slightly closer to the photographic subject than for a normal snap shot. Therefore, a photographing lens system of this kind is equipped with a drive mechanism that drives the lens to be displaced in the optical axis direction; by switching a switch, the drive mechanism is driven to move the lens in the optical axis direction (see Patent Reference 1, for example).

The lens driving apparatus disclosed in Patent Reference 1 comprises a lens barrel equipped with lenses, a movable body for retaining the lens barrel and a support body that supports the movable body to move in the optical axis direction of the lenses; a drive magnet is arranged to the movable body and a drive coil and two magnetic pieces (yokes) are arranged to the support body. The movable body is held at the closer of the two magnetic pieces by using magnetic attraction between the drive magnet and the magnetic piece when electrification to the drive coil is halted.

According to Patent Reference 1, the movable body moves in the direction of the optical axis of the lens in a limited, predetermined range. More specifically described, as disclosed in Patent Reference 1, the movable body (lens barrel) makes contact with a projection edge formed inwardly at the rear end of a first case division. Therefore, the lens barrel will not further move toward the rear end. In general, a guide mechanism configured with a recess (or a protrusion) which engages with a protrusion (or a recess) of the lens barrel is formed around the projection edge. This is provided for forming a rotating-prevention structure that prevents the lens barrel from rotating when the lens movable body receives shocks or vibrations.

Also, in the above-mentioned lens driving apparatus, the movable body and the support body are connected to each other via spring members; one has been proposed as the spring member, in which an outside joint portion is connected to the support member, an annular frame-type inside joint portion is connected to the movable body and an arm portion connects the outside joint portion to the inside joint portion, and the arm portion meanders back and forth outside the movable body (see Patent References 2, 3)

The arm portion demonstrates spring property in the spring member between the outside joint portion and the inside joint portion; therefore, when the movable body is moved in the optical axis direction, the spring member regulates the moving amount of the movable body in the optical axis direction. Mobile apparatuses frequently receive vibrations and shocks because they are mobile; such vibrations and shocks are absorbed by the arm portion.

[Patent Reference 1] Japanese Unexamined Patent Application (Tokkai) NO. 2005-37865 (FIG. 2)

[Patent Reference 2] Japanese Unexamined Patent Application (Tokkai) NO. 2006-201525

[Patent Reference 3] Japanese Unexamined Patent Application (Tokkai) NO. 2006-227103

Problems of the Prior Art. However, the guide mechanism disclosed in the above-mentioned Patent Reference 1 is formed in a complicated shape. Therefore, the manufacturing process of the lens driving apparatus becomes complicated, increasing time and cost of manufacturing. Also, as described above, the movable body (lens barrel) is regulated in its moving range by the projection edge located in the vicinity of the optical axis; when the lens body hits the projection edge, wear powder may be produced and may adhere to the sensor surface (such as a filter of a photo device) arranged in the vicinity. If wear powder adheres to the sensor surface, the photographed images become blurred, thus degrading the performance of the lens driving apparatus.

The present disclosure proposes a spring member having a shape which allows the spring member to be flexibly used even in a rectangular parallel-piped lens driving apparatus. In order to realize the proposal, the spring member is arranged in a small area between the frame portion of the support body whose cross-section perpendicular to the optical axis is a quadrangle barrel shape and the movable body whose outside circumference is circular cylindrical. However, when the spring member disclosed in Patent Reference 1, 2 is used in the lens driving apparatus having such a configuration, there is not much freedom in designing the arm portion and only an insufficient spring property can be demonstrated. Also, when the movable body in the lens driving apparatus receives a strong shock from being dropped and moves abruptly in the direction perpendicular to the optical axis direction (the left-right direction or circumferential direction) or the diagonal direction (the tilt direction) with respect to the optical axis direction, a conventional spring member may easily suffer from plastic deformation or breaking, causing problems such as poor stroke in the lens driving apparatus.

Considering the above problems, at least an embodiment of the present invention provides a lens driving apparatus that can prevent problems even when receiving a strong shock such as the impact of being dropped.

Also, at least an embodiment of the present invention may provide a lens driving apparatus that can prevent the problem in particular of wear powder adhering to a sensor surface even when the device receives a strong shock such as the impact of being dropped.

Further, at least an embodiment of the present invention may provide a lens driving apparatus that can prevent problems such as plastic deformation and breaking of the spring member when the device receives a strong shock such as the impact of being dropped.

SUMMARY OF THE INVENTION

To achieve the above, the present invention may feature a lens driving apparatus comprising a movable body holding lenses, a support body for supporting the movable body to move in the optical axis direction of the lenses, and a drive mechanism for driving the movable body in the optical axis direction; wherein the movable body is provided with an extension portion that is extended toward the outer periphery, and a moving path and a movement-stopping portion are formed to at least a member of the drive mechanism mounted on the support body or to the support body, the moving path allowing the extension portion to move in the optical axis direction when the movable body is moved in the optical axis direction and the movement-stopping portion regulating the moving range of the movable body.

According to at least an embodiment the present invention, it may comprise a movable body, a support body for supporting the movable body to move in the lens optical axis direction, and a drive mechanism for driving the support body, wherein the movable body is provided with an extension portion that is extended toward the outer periphery, and a moving path and a movement-stopping portion are formed to at least a member of the drive mechanism mounted on the support member or to the support body, the moving path allowing the extension portion to move in the optical axis direction when the movable body is moved in the optical axis direction and the movement-stopping portion regulating the moving range of the movable body. Therefore, the extension portion provided at the outer circumference of the movable body can move only within the range until it comes into contact with the movement-stopping portion. For this reason, even when the apparatus receives a strong shock caused by the impact of being dropped, at least one of the following problems can be prevented: the problem caused by excessive displacement of the movable body in the optical axis direction, the problem caused by the displacement of the movable body in the left-right direction perpendicular to the optical axis, or the problem caused by the rotational displacement of the movable lens in the circumferential direction. With the above-mentioned effects of the extension portion and the movement-stopping portion, the movable body is kept from excessive displacement beyond a predetermined range (for example, rotation at more than a predetermined angle). Also, unlike a conventional lens driving apparatus, a guide mechanism in a complicated shape is not necessary but the extension portion is simply formed to the movable body to add a rotating-prevention function, resulting in reduced time and cost of manufacturing and increased utility. Further, the position at which the extension portion makes contact with the movement-stopping portion is in the vicinity of the outer circumference of the lens moving body, not in the vicinity of the lens (sensor surface). In this way, wear powder, which may be produced when the extension portion makes contact with the movement-stopping portion, is prevented from adhering to the sensor surface.

In at least an embodiment the present invention, the drive mechanism has magnets arranged to the support body; the support body may be provided with a holder portion positioned on one end thereof in the optical axis direction, a cover portion positioned on the other end thereof in the optical axis direction, and a back yoke opposing the magnets; at that time, the movement-stopping portion may be provided to at least the cover portion, the holder portion, the back yoke or the magnets. According to the present invention, the above-mentioned drive mechanism has the magnets, the above-mentioned support body has the cover portion, the holder portion and the back yoke opposing the magnets, and the above-mentioned movement-stopping portion is provided to at least the cover portion, the holder portion, the back yoke or the magnets; therefore, even when the apparatus receives a strong shock from the impact of being dropped, at least the excessive displacement of the moving lens body in the optical axis direction, the displacement of the movable body in the left-right direction perpendicular to the optical axis, or the rotational displacement of the movable body in the circumferential direction can be prevented in a simple configuration.

In at least an embodiment of the present invention, a protrusion whose inside forms the moving path may be formed to the outer periphery of the support body. In this case, it is preferred that the protrusion and the extension portion be respectively formed at two places between which the lenses are positioned. According to at least an embodiment the present invention, the above-mentioned protrusion is formed at two places between which the lens is positioned; therefore, the effect of the movement-stopping portion can be increased, compared to the configuration in which the protrusion is provided at only one place. Note that although the protrusion is provided at two places in the present invention, the above-mentioned invention does not limit the number of places at which the protrusion could be formed.

In at least an embodiment of the present invention, it is preferred that the corner of the movement-stopping portion with which the extension portion makes contact be chamfered. In at least an embodiment of the present invention, the corner of the movement-stopping portion with which the extension portion makes contact is chamfered; therefore, less wear powder is produced, compared to the configuration in which the corner is angular.

In at least an embodiment of the present invention, it is preferred that a regulating means be provided for regulating the movement of the movable body caused by the electromagnetic force which is generated in the drive mechanism. According to at least an embodiment of the present invention, a regulating means is provided for regulating the movement of the movable body caused by the electromagnetic force which is generated in the drive mechanism; therefore, the movable body can be halted in a desired position. Even when the spring members are used as the regulating means, the extension portion and the movement-stopping portion can prevent the excessive displacement of the movable body in the optical axis direction, the displacement of the movable body in the left-right direction perpendicular to the optical axis, and the rotational displacement of the movable body in the circumferential direction. For this reason, the spring members can be kept from being damaged.

Next, in at least an embodiment of the present invention, a lens driving apparatus may comprise a movable body for holding lenses, a support body for supporting the movable body via spring members to move in the optical axis direction of the lenses, and a drive mechanism for driving the movable body in the optical axis direction; wherein the support body has a polygonal, barrel-shaped frame portion that surrounds the movable body; the spring member is provided with an outside joint portion that is connected to the support body, an inside joint portion connected to the movable body, and an arm portion connected to the inside joint portion and the outside joint portion; the arm portion is provided with a meander portion in which a plurality of elongated [parallel] portions are joined in series by turning portions and is placed at least two of a plurality of the corner portions formed with the outer circumferential face of the movable body and adjacent side wall faces of the frame portion.

In at least an embodiment of the present invention, as the spring member for supporting the movable body to move in the optical axis direction, the arm portion is provided between the outside joint portion and the inside joint portion, and the arm portion is arranged in at least two of a plurality of the corner portions formed by the adjacent side wall faces of the polygonal barrel-shaped frame portion and the outer circumferential face of the movable body. Therefore, even when the space bounded by the inner periphery of the frame and the outer circumference of the movable body is narrow, the arm portions are arranged in the relatively wide corner portions;

therefore, the number of the elongated [parallel] portions and turning portions can be increased. For this reason, even when the movable body is excessively displaced in the optical axis direction, displaced in the left-right direction perpendicular to the optical axis, rotationally displaced in the circumferential direction or displaced in the diagonal direction (tilt direction) with respect to the optical axis because of impact, etc., the spring members demonstrate excellent vibration resistance and shock resistance. Also, even when the movable body is excessively displaced in the optical axis direction, displaced in the left-right direction perpendicular to the optical axis, rotationally displaced in the circumferential direction or displaced in the diagonal direction (tilt direction) with respect to the optical axis because of impact, etc., the spring members are equipped with sufficient rigidity to endure the stress caused by such displacements; therefore, plastic deformation of the arm portion can be avoided for sure.

In at least an embodiment of the present invention, it is preferred that in the meander portion a plurality of the elongated [parallel] portions extend in the circumferential direction. With such a configuration, the number of the elongated [parallel] portions and turning portions can be increased. Therefore, even when the movable body is excessively displaced in the optical axis direction, displaced in the left-right direction perpendicular to the optical axis, rotationally displaced in the circumferential direction or displaced in the diagonal direction (tilt direction) with respect to the optical axis because of impact, etc., the spring members are equipped with sufficient rigidity to endure the stress caused by such displacements; therefore, plastic deformation of the arm portion can be avoided for sure.

In at least an embodiment of the present invention, it is preferred that in the meander portion three or more of the elongated [parallel] portions are arranged in parallel in the radial direction. Because of the increased number of the elongated [parallel] portions and turning portions, [the spring members] can endure the stress applied when the movable body is moved in the direction perpendicular to the optical axis direction or inclined in the diagonal direction with respect to the optical axis.

In at least an embodiment of the present invention, it is preferred that a plurality of the elongated [parallel] portions include parallel elongated [parallel] portions. Because of this configuration, even when the arm portion is deformed, the elongated [parallel] portions are kept from contacting and damaging each other.

In at least an embodiment of the present invention, it is preferred that a plurality of the elongated [parallel] portions be configured such that the portion on the inner side in the radial direction is longer than the one on the outer side in the radial direction. Because of this configuration, the number of the elongated [parallel] portions and the turning portions can be increased. For this reason, the spring members demonstrate excellent vibration resistance and shock resistance, and also since sufficient rigidity is provided, plastic deformation of the arm portion can be avoided for sure.

In at least an embodiment of the present invention, it is preferred that the arm portion be in a triangle outer peripheral shape in which its base is on the inner side in the radial direction and the vertex is deep in the corner of the corner portion. Because of such a configuration, the number of the elongated [parallel] portions and the turning portions can be increased. For this reason, the spring members demonstrate excellent vibration resistance and shock resistance, and also since sufficient rigidity is equipped, plastic deformation of the arm portion can be avoided for sure.

In at least an embodiment of the present invention, it is preferred that the meander portion be formed in the area shifted in the circumferential direction from the position radially right outside the connection portion between the inside joint portion and the arm portion. In this way, the arm portion can be formed in a wider area, making it possible to form the sufficiently long elongated [parallel] portions.

In at least an embodiment of the present invention, it is preferred that the width dimension of the connection portion between the inside joint portion and the arm portion be larger than that of the meander portion. In this way, even when a large load is applied to the inside joint portion, the inside joint portion will not be broken. Also, if the inside joint portion is formed to have wider width, the stress is applied to the arm portion when the movable body is displaced in the direction perpendicular to the optical axis direction or in the diagonal direction with respect to the optical axis; therefore, the stress caused when the movable body is displaced in the direction perpendicular to the optical axis direction or in the diagonal direction with respect to the optical axis, can be efficiently absorbed.

In at least an embodiment of the present invention, a configuration can be used in which, when observed in the optical axis direction, the outer circumferential shape of the movable body is circular and the outer circumferential face of the movable body projects further out than at least one side of an imaginary polygon created by connecting the median points of the adjacent sides of the frame portion. According to at least an embodiment of the present invention, the arm portion of the spring member is arranged in the space bounded by the outer circumference of the movable body and the inner periphery of the frame portion; therefore, the dimension of the space in which the arm portion is arranged varies according to the sizes of the movable body and the frame portion. Specifically, in the configuration in which a portion of the outer circumference of the movable body is located outside at least one side of an imaginary polygon created by connecting the median points of the adjacent sides of the frame portion, the above-mentioned space will be even narrower. However, in at least an embodiment of the present invention, the arm portions of the spring member are arranged in the corner portions formed by the adjacent side walls constituting the frame; therefore, even when the space bounded by the outer circumference of the movable body and the inner periphery of the frame portion is narrow, [the arm portions can be arranged without problem].

In at least an embodiment of the present invention, a configuration can be used in which, when observed in the optical axis direction, the outer circumferential face of the movable body projects further out than every side of the imaginary polygon.

In at least an embodiment of the present invention, it is preferred that magnets constituting the drive mechanism be arranged in at least two of a plurality of the corner portions. According to at least an embodiment of the present invention, by arranging the magnets in the corner portions formed by the adjacent side wall faces [of the frame portion], magnets having a sufficient mass can be arranged even when the space bounded by the outer circumference of the movable body and the inner periphery of the frame is narrow; thus, sufficient thrust can be given to the movable body.

In at least an embodiment of the present invention, it is preferred that the arm portion and the magnet be superposed in the optical axis direction in at least two of a plurality of the corner portions. In this way, the area occupied by the arm portion and the magnet can be smaller, thus downsizing the entire lens driving apparatus.

According to the lens driving apparatus of at least an embodiment of the present invention, the movable body is kept from being displaced excessively beyond a predetermined distance by using the effect of the above-mentioned extension portion and the movement-stopping portion. Also, by simplifying the configuration, the manufacturing process is kept from becoming complicated to increase utility. Further, the extension portion makes contact with the movement-stopping portion at a place away from the lens (sensor surface) unlike a conventional lens driving apparatus; therefore, wear powder is prevented from adhering to the sensor surface.

Also, in the lens driving apparatus of at least an embodiment of the present invention, the arm portions of the spring member are arranged in relatively wider corner portions even when the space bounded by the inner periphery of the frame portion and the outer circumference of the movable body is narrow; therefore, the number of the elongated [parallel] portions and the turning portions can be increased. For this reason, even when the movable body is excessively displaced in the optical axis direction, displaced in the left-right direction perpendicular to the optical axis, rotationally displaced in the circumferential direction or displaced in the diagonal direction (tilt direction) with respect to the optical axis because of impact, etc., the spring members demonstrate excellent vibration resistance and shock resistance. Also, even when the movable body is excessively displaced in the optical axis direction, displaced in the left-right direction perpendicular to the optical axis, rotationally displaced in the circumferential direction or displaced in the diagonal direction (tilt direction) with respect to the optical axis because of impact, etc., the spring members are provided with sufficient rigidity to endure the stress caused by such displacements; therefore, plastic deformation of the arm portions can be avoided for sure.

BRIEF DESCRIPTION OF THE FIGURES

Embodiments will now be described, by way of example only, with reference to the accompanying drawings which are meant to be exemplary, not limiting, and wherein like elements are numbered alike in several Figures, in which:

FIGS. 1(a)-1(b) are respectively an external appearance view of a lens driving apparatus of Embodiment 1 of the present invention, observing its front face diagonally from the top, and a perspective disassembly diagram.

FIGS. 2(a)-2(b) are respectively a perspective view and a plan view of the lens driving apparatus, with the cover off, to which the at least an embodiment present invention is applied.

FIGS. 3(a)-3(b) are views of the lens driving apparatus to which at least an embodiment the present invention is applied, observed from the right above.

FIGS. 4(a)-4(b) are explanatory illustrations schematically showing a section of the lens driving apparatus to which at least an embodiment the present invention is applied, cut along a predetermined direction.

FIGS. 5(a)-5(d) are explanatory illustrations to show the extension portion and the function of the extension portion in the lens driving apparatus to which at least an embodiment of the present invention is applied.

FIGS. 6(a)-6(c) are horizontal cross-sectional views of a lens driving apparatus of another embodiment of the present invention.

FIGS. 8(a)-8(c) are horizontal cross-sectional views of a lens driving apparatus of Embodiment 3 of the present invention.

DETAILED DESCRIPTION OF THE PREFERRED EMBODIMENTS

Figure 7:
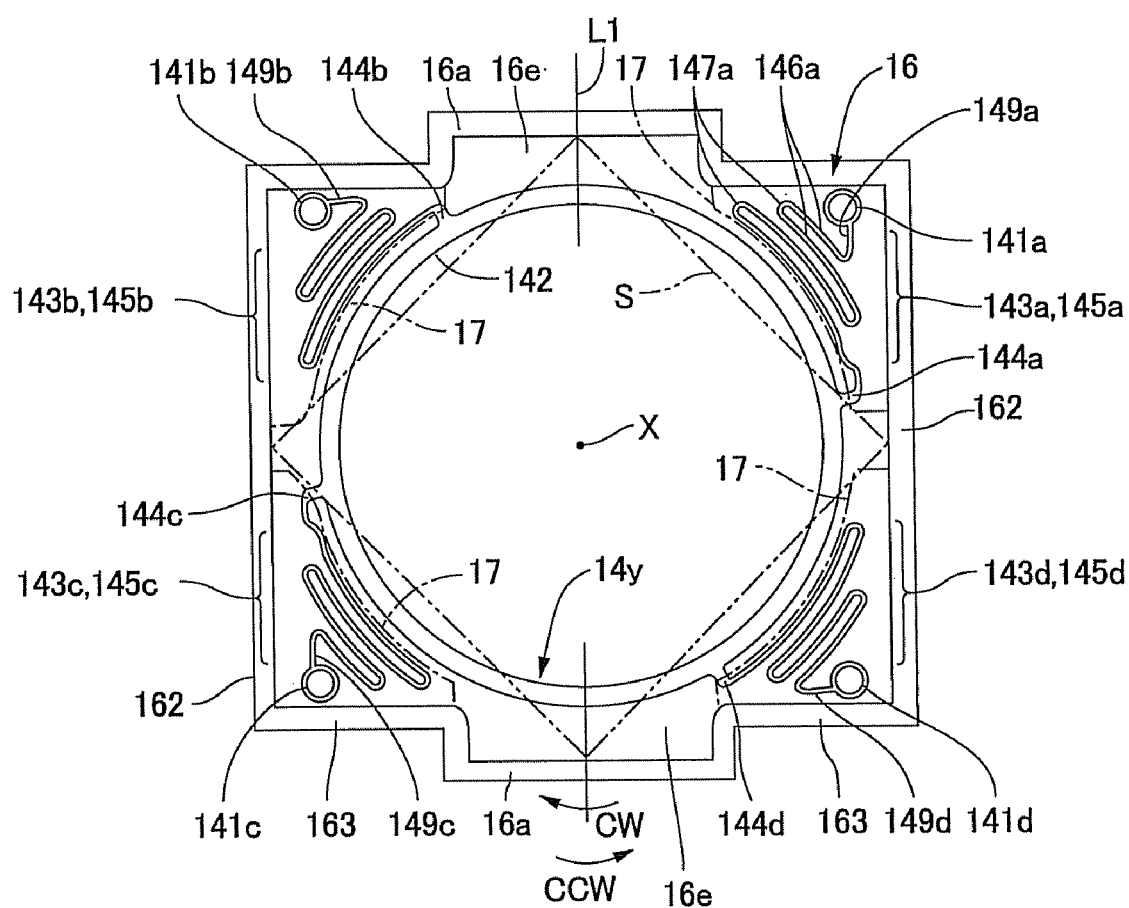
FIG. 7 A view of a lens driving apparatus of Embodiment 2 of the present invention, with the cover off.

The best mode and preferred embodiments of the present invention is described hereinafter referring to the drawings. Note that the lens driving apparatus described hereinafter can be installed not only in camera phones but also in various electronic apparatuses. For example, it can be used in thin digital cameras, PHSs, PDAs, barcode readers, surveillance cameras, cameras for checking behind vehicles, or doors having an optical verification function.

Embodiment 1

Overall Configuration

FIG. 1 (a) and (b) are respectively an external appearance view of the lens driving apparatus of Embodiment 1 of the present invention, observing the front of the apparatus diagonally from the top, and a perspective disassembly view.

Used in thin cameras such as digital cameras or camera phones, the lens driving apparatus 1 of this embodiment shown in FIG. 1 and FIG. 2 (a) moves three lenses 121 in both the A direction (to the front) and the B direction (to the back) along the optical axis, the A direction in which the lenses are moved toward a photographic subject (toward an object) and the B direction in which the lenses are moved in the opposite direction from the photographic subject (toward an image). It is in a rectangular parallelepiped. The lens driving apparatus 1 has a movable body 3 holding a cylindrical lens barrel 12 equipped with the three lenses 121 and a fixed aperture inside thereof, a drive mechanism 5 that moves the movable body 3 along the lens optical axis, and a support body 2 in which the drive mechanism 5 and the movable body 3 are installed. Also, the movable body 3 is provided with a cylindrical sleeve 13 inside which the cylindrical lens barrel 12 is fixed. Since the outside shape of the movable body 3 is defined by the sleeve 13, it is in a cylindrical shape.

In this embodiment, the support body 2 is provided with a rectangular holder 19 for holding an image pick-up device (not illustrated) on the image side, a rectangular case 11 positioned on the photographic subject side, a plate-like cover 18 (cover portion) for covering the end of the case 11 on the photographic subject side; circular light-entrance windows 110 and 180 are respectively formed in the center of the case 11 and the plate-like cover 18 for collecting the light reflected from the photographic subject into the lenses. The support body 2 is also equipped with a quadrangle barrel-shaped back yoke 16 (frame portion) sandwiched between the holder 19 and the case 11; the back yoke 16 together with magnets 17, which will be described later, constitute an interlinked magnetic field producing body 4 that produces an interlinked magnetic field to a coil 30. Note that, when the sleeve 13 is composed of a magnetic material, it also can be used as part of the interlinked magnetic field producing body 4.

The lens drive mechanism 5 is provided with the coil 30 wound around the outer circumferential face of the sleeve 13 and the interlinked magnetic field producing body 4 that produces an interlinked magnetic field to the coil 30; the coil 30 and the interlinked magnetic field producing body 4 together configure a magnetic drive mechanism 5a. The interlinked magnetic field producing body 4 is equipped with four magnets 17 opposing the coil 30 from the outer circumference and the quadrangle barrel-shaped back yoke 16 composed of a ferromagnetic plate such as steel plate.

The back yoke 16 is sandwiched between the holder 19 and the case 11, and is exposed to and constitutes the side faces of the lens driving apparatus 1. Also, the back yoke 16 surrounds the movable body 3.

The lens drive mechanism 5 is provided with spring members 14x and 14y respectively between the back yoke 16 and the holder 19 and between the back yoke 16 and the case 11. Both spring members 14x and 14y are made of metal and formed by pressing or etching a board of a predetermined thickness. Note that the thickness of the spring members 14x and 14y in the optical axis direction may be varied accordingly. Also, another configuration may be adopted in which different materials are used for the spring members 14x and 14y while the spring members 14x and 14y are formed in the same thickness. The spring member 14x positioned between the back yoke 16 and the holder 19 is divided into two spring pieces 14a and 14b; two terminals of the coil 30 are respectively connected to the spring pieces 14a and 14b. At that time, the terminal of the coil 30 arranged on the photographic subject side is passed through the groove (not illustrated) cut on the outer circumferential face of the sleeve 13 and under the coil 30 and pulled up to the spring piece 14a. In the spring member 14x held between the back yoke 16 and the holder 19, the spring pieces 14a and 14b are respectively formed with terminals 140a and 140b so that the spring member 14x also functions as a current-supply member to the coil 30.

In this embodiment, the spring member 14x is divided into two spring pieces 14a and 14b; the spring member 14x is cut after mounted in the lens driving apparatus 1, and the shape before cutting and the function after cutting are the same as those of the spring member 14y positioned between the back yoke 16 and the case 11.

The back yoke 16 is larger than the dimension of the area in the optical axis direction in which the coil 30 is arranged and also larger than the dimension of the drive magnet in the optical axis direction. Therefore, leakage of magnetic flux from the magnetic path configured between the magnets 17 and the coil 30 can be reduced, and the linearity between the amount of displacement of the sleeve 13 and the current flowing into the coil 30 can be improved. Accordingly, with the back yoke 16 of this embodiment, reduction in the above-mentioned leakage of magnetic flux can be obtained without forming the back yoke 16 into a shape to cover the side face and the bottom or top face of the coil 30.

The back yoke 16 has a rectangular outer periphery; a pair of opposing side faces 161 are formed flat while another pair of opposing side faces 162 are formed such that both ends 163 are recessed inwardly and protrusion 16a which projects outwardly like a step is formed in the center portion.

Note that the lens drive mechanism 5 may use a ring-type, bar-type or spherical magnetic piece (not illustrated) that is held on top of the sleeve 13; such a magnetic piece applies an urging force onto the movable body 3 in the optical axis direction because of the magnetic attraction force between the magnetic piece and the magnets 17. Since the movable body 3 can be kept from being displaced due to the dead load when it is not electrified, it is possible to maintain the movable body 3 in a desired position. Also, when the magnetic piece is formed in a ring shape, it can function as a kind of back yoke to reduce the leakage of magnetic flux from the magnetic path configured between the magnets 17 and the coil 30.

The case 11 covers the end of the back yoke 16 on the photographic subject side and has a plate portion 115 in which a light-entrance window 110 is formed in the center. In each of the four corners of the plate portion 115, a step portion 111 and a small protrusion 112 are formed, the step portion projecting toward the photographic subject and the small protrusion extending toward the image pick-up device; on a pair of opposing sides of the plate portion 115, holding portions 113 are formed to fit into notches 187 cut in the plate-like cover 18. Also, in the holder 19, a small protrusion 192 extending toward the photographic subject is formed in each of the four corners, and a column-like member 191 extends from the side face toward the photographic subject. Note that the small protrusions 192 on the holder 19 and the small protrusions 112 on the case 11 are used when the two spring members 14x and 14y are respectively connected to the support body 2.

The plate-like cover 18 is composed of a nonmagnetic thin plate (for example, SUS304) and has a ceiling portion 185 that covers the end of the case 11 on the photographic subject side. In the center of the ceiling portion 185 is formed a light-entrance window 180. The ceiling portion 185 is almost in a rectangular shape in which rectangular notches 186 and 187 are cut in the four corners and in the centers of a pair of opposing sides. From another pair of opposing sides of the ceiling portion 185, a pair of engaging legs 181 extend downward. Also, at the pair of the opposing sides of the ceiling portion 185, a pair of engaging legs 182 extend downward from both ends between which the notches 187 are sandwiched. Through holes 183 are bored around the center area of the engaging legs 181 and 182.

Therefore, when the plate-like cover 18 is layered on top of the holder 19, the spring member 14x, the back yoke 16, the spring member 14y and the case 11, the notches 187 in the plate-like cover 18 are respectively fitted into the holding portions 113 of the case 11 to position the plate-like cover 18 on the top face of the case 11. At that time, the step portions 111 formed in the four corners of the case 11 come into the notches 186 cut in the four corners of the ceiling portion 185. Also, the engaging legs 181 make contact with the side faces 161 of the back yoke 16, the engaging legs 182 make contact with the side faces 162 of the back yoke 16 and they sandwich the protrusion portions 16a. In the engaging legs 181 and 182 arranged in the above configuration, an anaerobic adhesive is applied through the through holes 183 to fix the side faces 161 and 162 and the engaging legs 181 and 182, and further the side faces 161 and 162 and the engaging legs 181 and 182 are connected through laser soldering so that the plate-like cover 18 is fixed to the back yoke 16.

In this embodiment, the four magnets 17 are fixed respectively in the four corner portions of the inner peripheral face of the back yoke 16. Each of the four magnets 17 is divided into two in the optical axis direction and magnetized to the poles different on the inside face and the outside face. Also, each of the four magnets 17 is magnetized such that the inside face is magnetized to N pole and the outside face to S pole in the top half and the inside face is magnetized to S pole and the outside face to N pole in the bottom half. Therefore, the coil 30 is also divided into two to correspond to the top half and the bottom half of the magnet 17; the divided coils are wound in the opposite directions from each other. Thus, the magnet 17 is divided and placed in the four corners so that, even when the space between the back yoke 16 and the sleeve 13 is narrow at the center portion of the sides of the back yoke 16, the magnet 17 is kept from having a thin portion, resulting in increased intensity in the magnet 17. Also, the magnet 17 can be easily installed inside the back yoke 16.

In this embodiment, on the outer circumferential face of the sleeve 13 are formed extension portions 13a and 13b which respectively project from the end of the sleeve 13 on the photographic subject side and from the end of the sleeve 13 on the image pick-up device side toward the outer circumference. The extension portions 13a and 13b are extended from the positions that sandwich the lens 121 (lens barrel 12) in the direction perpendicular to the optical axis, X. When the sleeve 13 (movable body 3) configured as above is placed inside the support body 2, the extension portions 13a and 13b are positioned inside the protrusions 16a of the back yoke 16 between the adjacent magnets 17. The protrusions 16a extend in the optical axis direction and function as a moving path 16e that allows the movement of the extension portions 13a and 13b in the optical axis direction when the movable body 3 is moved in the optical axis direction. Also, when the movable body 3 is displaced in the direction perpendicular to the optical axis direction (the left-right direction or the circumferential direction), the extension portions 13a make contact with the inner wall of the protrusions 16a of the back yoke 13; therefore, the movable body 3 is prevented from further displacement in the left-right direction perpendicular to the optical axis direction or from rotational displacement in the circumferential direction. Note that step portions or protrusion portions (not illustrated) may be formed at the end portion of the sleeve 13 on the photographic subject side or the end portion of the sleeve 13 on the image pick-up device for positioning the spring members 14x and 14y.

(Detailed Configuration of Sleeve) FIG. 2 (a) and (b) are respectively a perspective view and a plan view of the lens driving apparatus without the cover portion, to which the present invention may be applied. FIG. 3 is a view of the lens driving apparatus 1 shown in FIG. 2, observed from the top. Specifically, FIG. 3 (a) shows the external configuration and FIG. 3 (b) is a cross-section of the lens driving apparatus 1, cut horizontally around the middle area in the height thereof. FIG. 4 is an explanatory diagram to schematically show the lens driving apparatus 1 of FIG. 1 when cut along the predetermined direction. Specifically, FIG. 4 (a) is a vertical cross-sectional view of the lens driving apparatus 1 of FIG. 3, cut along the single-dotted line A-A'; FIG. 4 (b) is a vertical cross-sectional view of the lens driving apparatus 1 of FIG. 3 cut along the single-dotted line B-B'. Note that in FIG. 3 and FIG. 4, the lens barrel 12 is installed inside the sleeve 13.

FIG. 2 (a) shows the lens driving apparatus 1 of this embodiment in which the extension portions 13a that extend in the direction perpendicular to the lens optical axis, X, are formed to the outer circumference of the sleeve 13. The function of the extension portions 13a will be described in detail hereinafter.

As shown in FIG. 3 (a), when the lens driving apparatus 1 is observed from the top (from the front side), the case 11 is not in a square or rectangular shape. This is because there is a standard (called SMIA85) that should be kept when a lens, an actuator or camera modules such as a substrate having a sensor and a circuit device thereon are installed and fixed in a socket. The standard is followed to facilitate the attachment and detachment of the socket.

As shown in FIG. 3 (b), the lens barrel 12, the sleeve 13, and the magnets 17 are surrounded by the back yoke 16 which is in the same shape as the case 11. The protrusions 16b are formed at the portions of the back yoke 16 located on the outer circumferential side of the magnets 17 and the coil 30; the above-mentioned moving paths 16e of the extension portions 13a and 13b (see FIG. 1 (b)) can be obtained inside the protrusions 16a. The extension portions 13a and 13b are respectively provided in two places at the ends of the sleeve on the photographic subject side and on the image pick-up device side so that the lens (lens barrel 12) is interposed between them.

Note that in the movable body 3, the extension portions 13a and 13b on the photographic subject side and on the image pick-up device side have the identical outer peripheral shape when observed in the optical axis direction; therefore, the extension portion 13a will be mainly described hereinafter.

In this embodiment, inside the protrusion 16a are formed movement-stopping portions 16b and 16c with which the extension portion 13a can make contact. The movement-stopping portion 16b and the movement-stopping portion 16c are in a perpendicular positional relationship; the corner portion of the movement-stopping portion 16c with which the extension portion 13a makes contact when the sleeve 13 is rotated is chamfered. Note that the surface of the extension portion 13a which makes contact with the inner wall of the protrusion 16a of the back yoke 16 may be chamfered or configured as an angular surface.

The left half of FIG. 4 (a) shows that the sleeve 13 is at its infinity position (position for normal photography); the right half of FIG. 4 (b) shows that the sleeve 13 is at its macro position (position for close-up photography). As shown in FIG. 4 (a), the sleeve 13 is provided with the extension portions 13a and 13b; when the sleeve 13 is at its normal photographing position, the rear end face 13d of the extension portion 13b which is located on the back side makes contact with the holder 19. On the other hand, when the sleeve 13 is at its macro photographing position, the front end face 13c of the extension portion 13a [which is located on the front side] makes contact with the case 11. In this manner, the sleeve 13 makes contact with the case 11 or the holder 19 at the position in the outer circumference away from the lens barrel 12, and the case 11 and the holder 16 both function as the movement-stopping portions for the extension portions 13a and 13b. Therefore, the movable body 3 will not be excessively displaced in the optical axis direction.

As shown in FIG. 4 (b), the magnets 17 are interposed between the spring members 14x and 14y which are positioned on the front side and on the back side. The spring members 14x and 14y are for regulating the movement of the sleeve 13 and can halt the sleeve 13 in the position at which the spring members attain equilibrium with the electromagnetic force produced in the drive mechanism (such as the coil 30). Note that the rear end face or front end face of the cylindrical barrel portion of the sleeve 13 is not in contact with the holder 19 or the case 11 either at its normal photographing position shown in the left half or at its macro position in the right half in the cross-sectional view shown in FIG. 4 (b).

Also, as shown in FIG. 5 (a), when the sleeve 13 is displaced upwardly in the figure (see the arrow) by some kind of shock, the extension portions 13a and 13b of the sleeve 13 make contact with the movement-stopping portion 16b of the back yoke 16. Then, the extension portion 13a is kept from further displacement outwardly in the radial direction (the direction perpendicular to the optical axis, X). Thus, the extension portion 13a and the movement-stopping portion 16b function as a stopper.

As shown in FIG. 5 (b), when the sleeve 13 is displaced to the right in the figure (see the arrow) by some kind of shock, the extension portions 13a and 13b of the sleeve 13 make contact with the movement-stopping portion 16c of the back yoke 16. Then, the extension portion 13a is kept from displacement further to the right. Thus, the extension portion 13a and the movement-stopping portion 16c function as a stopper.

The movement-stopping portion 16c also demonstrates a rotating-prevention function in the rotation direction of the sleeve 13. More specifically described, as shown in FIG. 5 (c), when the sleeve 13 is displaced clockwise in the figure (see the arrow) by some kind of shock, the extension portion 13a of the sleeve 13 makes contact with the movement-stopping portion 16c of the back yoke 16. Then, the extension portion 13a is kept from further rotation to the right. Thus, the extension portion 13a and the movement-stopping portion 16c function as a stopper.

Note that FIG. 5 (d) shows the sleeve 13 in a normal condition in which no force is exerted.

(Detailed Configuration of Spring Member) As shown in FIG. 1 (b), the lens driving apparatus 1 is provided with the spring members 14x and 14y that regulate the movement of the sleeve 13 prompted by the electromagnetic force produced in the drive mechanism. In this embodiment, the spring members 14x and 14y are formed as gimbal springs.

The spring members 14x and 14y are metallic springs: the spring member 14x is positioned between the back yoke 16 and the holder 19, and the spring member 14y is positioned between the back yoke 16 and the case 11. The configuration of the spring member 14y positioned between the back yoke 16 and the case 11 will be described.

As shown in FIG. 2 (b), the spring member 14y in this embodiment is provided with four small annular outside joint portions 141a, 141b, 141c and 141d, which are held between the back yoke 16 and the case 11 in the support body 2, a ring-like inside joint portion 142 connected to the front end of the sleeve 13, four arm portions 143a, 143b, 143c and 143d that connect the inside joint portion 142 and the outside joint portions 141a, 141b, 141c and 141d. The four outside joint portions 141a through 141d are respectively positioned in the four corners of the rectangular back yoke 16 (frame portion) constituting the support body 2; the small protrusions 112 formed to the case 11 are inserted inside the outside joint portions 141a through 141d so that the spring member 14y is sandwiched between the case 11 and the back yoke 16. At that time, insulation is applied between the back yoke 16 and the spring member 14y. Note that the four magnets 17 (shown by the single-dotted line) are respectively arranged in the four corners of the back yoke 16, and the four arm portions 143a through 143d are superposed on the magnets 17 in the optical axis direction.

Part of the outer circumferential face of the inside joint portion 142 is located outside (on the back yoke 16 side) an imaginary quadrangle S (indicated by the double-dotted line in FIG. 2 (b)) which is formed by connecting the median points of the side wall faces constituting the back yoke 16.

Also, the spring member 14y is formed to have a configuration in which the four arm portions 143a through 143d are arranged by line symmetry with respect to L1 that passes through the optical axis, X, and divides the spring member 14y into two.

Describing the arm portion 143a first, referring to FIG. 2 (b), it is connected to the inside joint portion 142 via an inside connecting portion 144a and to the outside joint portion 141a via an outside connecting portion 149a.

The arm portion 143a is provided with a meander portion 145a in which three straight or arc-shaped elongated [parallel] portions 146a extending in the circumferential direction of the inside joint portion 142 are joined in series by turning portions 147a. The three elongated [parallel] portions 146a are extended almost parallel to each other and arranged in parallel in the radial direction. The inside connecting portion 144a is configured to have a width wider than the width dimension of the meander portion 145a so that radial rigidity of the spring member 14y can be increased.

A plurality of the elongated [parallel] portions 146a are configured such that the portion positioned on the radially inner side is longer than the portion positioned on the radially outer side. For this reason, the arm portion 141a is in a triangular shape whose base is positioned on the radially inner side and vertex is located deep in the corner of the corner portion. Although the arm portion 141a is arranged in a narrow area, it is configured with many elongated [parallel] portions 146a and turning portions 147a.

The arm portions 143b through 143d are respectively connected to the inside joint portion 142 via inside connecting portions 144b through 144d and to the outside joint portions 141b through 141d via outside connecting portions 149b through 149d; since the meander portions 145b through 145d thereof are in the same configuration as that of the arm portion 143a, their description is omitted.

In the spring member 14y configured as above, the arm portions 143b and 143d are configured such that the meander portions 145b and 145d are formed not on the radially right outside the inside connecting portions 144b and 144d, but in the positions shifted from the radially right outside the inside connecting portions 144b and 144d to one side in the circumferential direction (in the clockwise (CW) direction in FIG. 2 (b)). In the same manner, the arm portions 143a and 143c are configured such that the meander portions 145a and 145c are formed not radially right outside the inside connecting portions 144a and 144c, but in the positions shifted from radially right outside the inside connecting portions 144a and 144c to one side in the circumferential direction (in the counterclockwise (CCW) direction in FIG. 2 (b)). In this way, the elongated [parallel] portions 146a extending from the inside connecting portion 144 can be long; therefore, radial rigidity in the spring member 14y can be increased.

In this embodiment, in each of a plurality of arm portions 143a through 143d, the extension line from the inside connecting portion extends parallel to each other in the areas that sandwich the center position of the inside joint portion 142. In this way, the positions at which the arm portions 143a through 143d give spring property to the movable body are dispersed in a plane perpendicular to the optical axis, X, resulting in a stabilized spring constant for the spring member 14y; therefore, vibrations exerted on the movable body 3 in the tilt direction can be efficiently prevented.

The spring member 14y configured as above urges the front end or the rear end of the sleeve 13 through resilience produced in the four arm portions 143a through 143d. Although only the spring member 14y positioned on the front end of the sleeve 13 is described in FIG. 2 for convenience of description, the spring member 14x positioned on the rear side of the sleeve 13 has the same configuration. Therefore, the description of the spring member 14x positioned on the rear side of the sleeve 13 is omitted.

(Basic Operation) In the lens driving apparatus 1 configured as above, the movable body 3 is normally positioned on the image pick-up device side (on the image side). More specifically described, the movable lens is positioned such that the bottom end face of the sleeve 13 (the face on the image side) is in contact with the top face of the holder 19 (the face on the front side).

Under such conditions, when current in a predetermined direction is passed through the coil 30, the upward electromagnetic force (toward the front) is exerted on the coil 30. With this, the sleeve 13 on which the coil 30 is firmly fixed starts moving toward the photographic subject (toward the front). At that time, resilient force that regulates the movement of the sleeve 13 is produced between the spring member 14y and the front end of the sleeve 13 and between the spring member 14x and the rear end of the sleeve 13. Therefore, when the electromagnetic force that moves the sleeve 13 toward the front attains equilibrium with the resilient force that regulates the movement of the sleeve 13, the sleeve 13 is halted. Also, when current in the opposite direction is passed through the coil 30, the downward electromagnetic force (toward the back) is exerted on the coil 30.

At that time, the intensity of the current passing through the coil 30 is adjusted according to the resilient force of the spring members 14x and 14y exerted on the sleeve 13 so that the sleeve 13 (movable body 3) can be halted in a desired position.

In this embodiment are used the spring members 14x and 14y in which a linear relationship is established between the resilient force (stress) and the amount of displacement; therefore, linearity between the amount of the displacement of the sleeve 13 and the current passing through the coil 30 can be improved. Also, since two spring members 14x and 14y are used, a large, balanced force is applied in the direction of the optical axis, X, when the sleeve 13 is halted. Therefore, even when a centrifugal force or another force such as a shock is exerted in the direction of the optical axis, X, the sleeve 13 can be halted with more stability. Further, in the lens driving apparatus 1, the sleeve 13 is halted not by colliding with a buffer material but by utilizing equilibrium between the electromagnetic force and the resilient force; therefore, the colliding noise can be prevented.

(Major Effects of This Embodiment) As described above, according to the lens driving apparatus 1 of this embodiment, the sleeve 13 can be kept from excessive displacement of more than predetermined distance (excessive rotation by more than a predetermined angle as shown in FIG. 5 (c)), which is caused by shock, etc (see FIG. 5). Specifically, in the lens driving apparatus 1 of this embodiment, only one stopper (protrusion 16a) is provided to prevent up-down displacement, left-right displacement, and rotational displacement; therefore, manufacturing cost is reduced, the manufacturing process is simplified, and the lens driving apparatus 1 can be downsized overall, thus providing practical advantages. Unlike a conventional lens driving apparatus in which a complex-shaped guide mechanism is provided, the extension portions 13a and 13b are simply formed to the sleeve 13 to add a detent prevention mechanism, resulting in increased utility.

Also, unlike a conventional lens driving apparatus, the extension portions 13a and 13b make contact with the movement-stopping portions 16b and 16c (see FIG. 5) on the outer circumferential side, not in the vicinity of the lens. Therefore, even if wear powder is generated when the extension portions 13a and 13b make contact with the movement-stopping portions 16b and 16c, the wear powder is prevented from adhering to the sensor surface of the image pick-up device on the holder 19 side.

The movement-stopping portion 16c of the back yoke 16 with which the extension portions 13a and 13b make contact is chamfered; therefore, less wear powder is produced compared to the configuration in which the movement-stopping portion is formed as an angular surface.

The protrusion 16a of the back yoke 16 inside which the movement-stopping portions 16b and 16c are formed is provided at two places interposing the lenses. Therefore, the effect of the movement-stopping portion can be increased compared to the configuration in which the protrusion is provided only at one place. Also, the sleeve 13 is prevented from excessive displacement of more than predetermined range in the left-right direction with respect to the optical axis direction of the lens or excessive rotation by more than a predetermined angle in the rotation direction when the lens driving apparatus 1 receives shock, etc.

Further, in the lens driving apparatus 1 of this embodiment, the movement of the sleeve 13 is regulated by the spring members 14x and 14y, and the deformation of the spring members 14x and 14y can be prevented by the effect of the extension portion 13a and movement-stopping portions 16b and 16c. In other words, if the sleeve 13 is displaced more than a predetermined distance, the spring members 14x and 14y easily suffer plastic deformation; however, according to this embodiment, such a problem can be prevented.

Furthermore, in this embodiment, the spring members 14x and 14y provided with four arm portions 143a through 143d between the outside joint portion 141a through 141d and the inside joint portion 142, and the arm portion 143a, for example, is provided with the meander portion 145a in which a plurality of elongated [parallel] portions 146a extending in the circumferential direction are joined in series by the turning portions 147a; other arm portions 143b, 143c and 143d are configured in the same manner. Also, the four arm portions 143a through 143d are arranged in the four corners of the rectangular back yoke 16. Thus, in the space bounded by the inner periphery of the back yoke 16 and the outer circumference of the movable body, the arm portions 143a through 143d are respectively positioned in the relatively wide four corners of the back yoke 16 so that more elongated [parallel] portions 146a can be arranged and accordingly the number of the turning portions 147a can be increased, compared to the configuration in which the arm portions 143a through 143d are arranged anywhere around the back yoke 16 other than in the four corners. Also, by arranging the elongated [parallel] portions 146a along the circumferential direction of the movable body 3, more elongated [parallel] portions 146a can be arranged; therefore, the same effect can be obtained. Therefore, excellent vibration resistance and shock resistance can be demonstrated at the time when the movable body 3 is moved in the direction perpendicular to the optical axis direction or inclined in the diagonal direction (tilt direction) with respect to the optical axis. Also sufficient rigidity is obtained to endure stress exerted when the movable body 3 is moved in the perpendicular to the optical axis direction or inclined in the diagonal direction with respect to the optical axis; therefore, plastic deformation of the arm portions 143a through 143d can be prevented for sure.

Since the inside connecting portions 144a through 144d are formed wider than the arm portions 143a through 143d, even when a large load is applied to the inside connecting portions 144a through 144d, they will not be broken. With the inside connecting portions 144a through 144d of wider width, the stress is exerted on the meander portions 145a through 145d when the movable body 3 is moved in the direction perpendicular to the optical axis, X, or inclined in the diagonal direction with respect to the optical axis, X; therefore, the stress caused when the movable body 3 is moved in the direction perpendicular to the optical axis, X, or inclined in the diagonal direction with respect to the optical axis, X, can be efficiently absorbed.

Modification Example of Embodiment 1

FIG. 6 is a horizontal cross-sectional view of a lens driving apparatus of Modification Example of Embodiment 1. In the lens driving apparatus 1 shown in FIG. 2, the magnetic circuit is constituted by the back yoke 16, the magnets 17, and the coil 30; however, an inner yoke 21 may be added to form the magnetic circuit as in a lens driving apparatus 1A shown in FIG. 6 (a). In this way, a magnetic flux can be induced in a desired direction (leakage of magnetic flux can be reduced), providing the stable electromagnetic force.

As in a lens driving apparatus 1B shown in FIG. 6 (b), the shape of the coil 30 may be changed to use it as a stopper. In other words, the coil 30 moves together with the sleeve 13 in the moving-coil-type lens driving apparatus 1B; for example, when the sleeve 13 is displaced upwardly in the figure by some kind of shock, the coil 30 is also displaced and a modified portion 30a of the coil 30 (an example of the extension portion) makes contact with the movement-stopping portion 16b of the back yoke 16. It will be so even when the sleeve 13 is displaced to the right in the figure (or to the left) or in the direction of rotation (right or left) by some kind of shock. Because of the function of the modified portion 30a of the coil 30 and the protrusion 16a (the movement-stopping portion 16b or 16c), the coil 30 can be a substitute for a stopper.

Although it is not illustrated, an extension portion 13a may be provided to the sleeve 13 so that it may make contact with the movement-stopping portion 16b. As described above, even when the shape of the coil 30 is changed to use it as a stopper or even when the shape of the coil 30 is changed and a stopper is configured by the extension portion 13a of the sleeve 13, the entire length of the coil can be increased by changing the shape of the coil, thus increasing magnetic force.

The modification example of the portion of the lens driving apparatus 1A shown in FIG. 6 (a) framed by the dotted-line, Y is magnified in FIG. 6 (c). According to the modification example shown in FIG. 6 (c), when the extension portion 13a of the sleeve 13 is displaced to the right in the figure or in the direction of right-handed rotation, the extension portion 13a makes contact with a movement-stopping portion 17g of the magnet 17. In this manner, the movement-stopping portion 17g may be provided to the back yoke 16 (see the protrusion portion 16a), to the magnet 17, or to other members such as the case 11 and the holder 19. In other words, the movement-stopping portion with which the extension 13a makes contact can be formed either to the member in the drive mechanism 5 arranged to the support body 2 or to the support body 2.

Embodiment 2

FIG. 7 is a plan view of a lens driving apparatus of Embodiment 2 of the present invention, with the cover off. Since the basic configuration of this embodiment remains the same as Embodiment 1, the overall configuration is described referring to FIG. 1 (a) and (b), and the same codes are given to the common members and their description is omitted.

As shown in FIG. 1 (a) and (b), even in the lens driving apparatus 1 of this embodiment, the spring members 14x and 14y are respectively arranged between the back yoke 16 and the holder 19 and between the back yoke 16 and the case 11. The spring members 14x and 14y share the same basic configuration; therefore, the spring member 14y arranged between the back yoke 16 and the case 11 is used to describe the configuration.

As shown in FIG. 7, the spring member 14y is provided, in the same manner as Embodiment 1, with four small annular outside joint portions 141a, 141b, 141c and 141d held between the back yoke 16 and the case 11 in the support body 2, a ring-shaped inside joint portion 142 joined with the front end of the sleeve 13, four arm portions 143a, 143b, 143c and 143d for connecting the inside joint portion 142 and the outside joint portions 141a, 141b, 141c and 141d. Even in this embodiment, four magnets 17 (indicated by the single-dotted line) are respectively arranged in the four corners of the back yoke 16, and the four arm portions 143a through 143d are superposed on the magnets 17 in the optical axis direction. Portion of the outer circumferential face of the inside joint portion 142 are located outside (the back yoke 16 side) the imaginary quadrangle S (indicated by the double-dotted line in FIG. 7) which is created by connecting the median points of the side wall faces constituting the back yoke 16.

In this embodiment, the arm portion 143a is connected to the inside joint portion 142 via the inside connecting portion 144a and to the outside joint portion 141a via the outside connecting portion 149a. Also, the arm portion 143a is provided with the meander portion 145a in which three straight or arc-shaped elongated [parallel] portions 146a that extend in the circumferential direction of the inside joint portion 142 are joined in series by the turning portions 147a. The three elongated [parallel] portions 146a extend almost parallel to each other and are arranged in parallel in the radial direction. The inside connecting portion 144a is wider than the width dimension of the meander portion 145a. In the same manner as the arm portion 143a, the arm portions 143b through 143d are respectively connected to the inside joint portion 142 via the inside connecting portions 144b through 144d and to the outside joint portions 141b through 141d via the outside connecting portion 149b though 149d; since the structure of the meander portions 145b through 145d are the same as that of the arm portion 143a, its description is omitted.

In the spring member 14y of this embodiment configured as above, the four arm portions 143a through 143d are in rotational symmetry about the optical axis, X. In other words, when one arm is rotated about the optical axis, X, by a predetermined angle such as 90°, the arm portion comes into the position of another arm.

The spring member 14x configured in the same manner as the spring 14y is arranged on the rear side of the sleeve 13. Even in the spring member 14x, each arm portion is in rotational symmetry about the optical axis, X. Since the two spring members 14x and 14y are arranged in the same direction, the arm portions 143a through 143d of the spring member 14y and the arm portions of the spring member 14x are in rotational symmetry about the optical axis, X.

In this way, even when the arm portions 143a through 143d are deformed when the movable body 3 is moved in the optical axis direction, all the arm portions 143a through 143d are deformed in the same manner. Therefore, even when the narrow gap around the movable body 3 restricts the shape of the arm portions 143a through 143d, the movable body 3 will not be inclined. Also, a configuration may be used in which, when the movable body 3 is moved in the optical axis direction, the movable body 3 is rotated in the circumferential direction within the range where lens aberration does not affect the performance.

Embodiment 3

FIG. 8 is a horizontal cross-sectional view of a lens driving apparatus of Embodiment 3 of the prevent invention. FIG. 3 (a) shows that the lens driving apparatus 1 of FIG. 2 in which the case 11 is not formed in a shape of a square or rectangle when viewed from the top (from the front side) but is formed according to the standard (SMIA85); however, in this embodiment, the case 11 is shaped in a right square or rectangle.

As in a lens driving apparatus 1C shown in FIG. 8 (a), the movement-stopping portion 16b may be provided to the back yoke 16 to make contact with the extension portion 13a of the sleeve 13 along the inner peripheral face of the case 11 configured as a level face.

As in a lens driving apparatus ID shown in FIG. 8 (b), a level portion 16d formed to the outer peripheral face of the back yoke 16 in which the movement-stopping portion 16b is formed may make a continuous surface with a level face of the case 11.

As in a lens driving apparatus 1E shown in FIG. 8 (c), the magnet 17 may be provided with a movement-stopping portion 17a along the inner peripheral face of the case 11 configured as a level face so that the extension portion 13a of the sleeve 13 makes contact with the movement-stopping portion 17a.

In either of the above-described embodiments, the outside shape of any of the lens driving apparatus 1C through 1E is in a right square or rectangle, facilitating the installation in the apparatus.

Other Embodiments

In the above embodiments, there are four magnets which are respectively arranged in the four corners of the back yoke 16; however, [only] two magnets may be arranged in the opposing corners of the four corners of the back yoke 16. In the same manner, in each of the spring members 14x and 14y, [only] two arm portions may be provided and arranged in the opposing corners of the four corner portions of the back yoke 16. At that time, the magnets 17 and the arm portions may be superposed in the optical axis direction, or the arm portions may be arranged at the position different from the places in which the magnets are arranged.

In the above embodiments, the outer periphery of the back yoke 16 is rectangle; however, it can be in any shape in the present invention as long as the outer periphery of the back yoke 16 is formed by a plurality of planes parallel to a line tangent to the outer circumference of the movable body. Therefore, the imaginary polygon created by connecting the median points of the side wall faces constituting the back yoke 16 is not limited to square (see FIG. 2 (b)).

In the present invention, another configuration may be used in which, when an imaginary square is created based on the shortest distance between the outer circumference of the movable body and the inner periphery of the back yoke 16, the outer circumference of the movable body is positioned outside (on the back yoke side) at least one side of a square formed by connecting the median points of the sides of the imaginary square.

DESCRIPTION OF CODES 1A through 1E Lens driving apparatus
11 Case
12 Lens barrel
13 Sleeve
14x, 14y Spring member
16 Back yoke
17 Magnet
18 Plate-like cover (cover portion)
19 Holder
30 Coil
21 Inside yoke
141a, 141b, 141c, 141d Outside joint portion
142a, 142b, 142c, 142d Inner joint portion
143a, 143b, 143c, 143d Arm portion
145a, 145b, 145c, 145d Meander portion
146a Straight line (Elongated [parallel] portion)
147a Turning portion The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens driving apparatus comprising:
   a movable body holding lenses;
   a support body for supporting said movable body via spring members to move in the optical axis direction of said lenses; and
   a drive mechanism for driving said movable body in the optical axis direction;
   wherein said support body has a polygonal barrel-shaped frame portion that surrounds said movable body;
   said spring member has outside joint portions that are connected to said support body, an inside joint portion that is connected to said movable body, and arm portions connected to said inside joint portion and said outside joint portions;
   each of the arm portions comprises a meander portion;
   said meander portion comprises three or more elongated parallel portions which are respectively elongated toward a circumferential direction of the inside joint portion and are arranged in parallel in the radial direction and are joined in series by turning portions; and
   the arm portions are arranged in at least two of a plurality of corner portions created with the outer circumferential face of said movable body and adjacent side wall faces in said frame;
   said arm portions are in a triangle outer peripheral shape in which a base is on the inner side in the radial direction and a vertex is deep in the corner of said corner portion.

2. The lens driving apparatus as set forth in claim 1 wherein a plurality of said elongated parallel portions are configured such that the portion on the inner side in the radial direction is longer than the portion on the outer side in the radial direction.

3. The lens driving apparatus as set forth in claim 1 wherein said meander portion is provided in the area shifted in the circumferential direction from the radially right outside a connection portion between said inside joint portion and said arm portion.

4. The lens driving apparatus as set forth in claim 1 wherein a width dimension of a connection portion between said inside joint and said arm portion is larger than that of said meander portion.

5. The lens driving apparatus as set forth in claim 1 wherein, when observed in the optical axis direction, the outer circumferential shape of said movable body is circular and the outer circumferential face of said movable body projects further out than at least one side of an imaginary polygon created by connecting the median points of the adjacent sides of said frame portion.

6. The lens driving apparatus as set forth in claim 5 wherein, when observed in the optical axis direction, the outer circumferential face of said movable body projects further out than every side of said imaginary polygon.

7. The lens driving apparatus as set forth in any of claim 1 wherein magnets that constitute said drive mechanism are arranged in at least two of a plurality of said corner portions.

8. The lens driving apparatus as set forth in claim 7 wherein said arm portions and said magnets are superposed in said optical axis direction in at least two of a plurality of said corner portions.

* * * * *